Patented Aug. 16, 1932

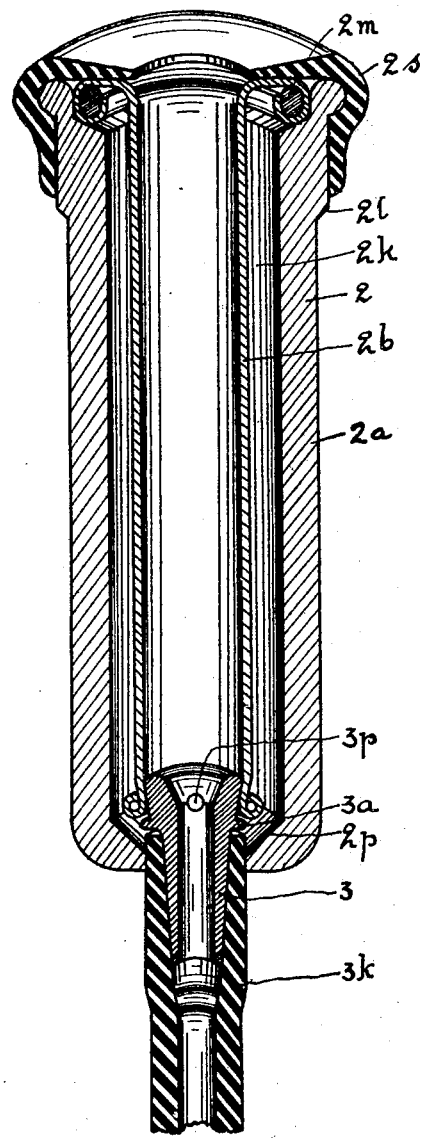

1,871,520

UNITED STATES PATENT OFFICE

FERNAND HENRARD, OF BRUSSELS, BELGIUM, ASSIGNOR TO ECREMEUSES MELOTTE SOCIETE ANONYME, OF REMICOURT, BELGIUM

MILKING MACHINE

Application filed October 4, 1929. Serial No. 397,282.

In milking machines employed up to the present time the milking operation has been effected by a suction transmitted to the teat, this suction being either of varying intensity or permanent and combined with a varying pressure applied to the body of the teat by means of pulsating members. The arrangement of the teat in a rubber sleeve has permitted the milking operation to be assisted and the congestion of the teats produced by the suction to be partly overcome but the compression produced by the sleeve has had the effect of driving a part of the milk contained in the teat back into the udder and thus reducing the useful action of the apparatus. Moreover the alternate and successive tensions acting upon the sleeve weakened it and rapidly caused it to become useless.

The present invention removes these disadvantages by means of a simplified arrangement of the apparatus and by dispensing with the complicated pulsating members.

According to the invention the vacuum effect is secured in a permanent manner at the end of the teats while their body is removed from the action of atmospheric pressure, thus preventing them from being flattened and from the action of the vacuum, thus preventing the congestion of the teats.

This protection against flattening is secured by arranging the teat in a member adapted to exert a radial effort outwards in such a way as to counter-balance the action of the atmospheric pressure.

According to one construction of the invention, the body of the teat, which carries the said member by means of an elastic element, can be removed from the action of atmospheric pressure by forming a chamber which is fluid tight, the atmospheric pressure between this elastic element and the indeformable member or casing enveloping the elastic element and the teat.

The accompanying drawing illustrates one embodiment of the invention by way of example and in a non-limiting manner.

The single figure is a half-section in perspective view of a milking cup according to the invention.

The milking cup 2 comprises a metal casing 2a enclosing an elastic element such as the rubber sleeve or tube 2b in which the teat, not shown in the drawing, engages, and communicates with the vacuum duct 3k.

In this milking cup any communication with the atmospheric pressure is prevented when the cup is in its normal position of operation. At this moment the teat is engaged in the sleeve 2b of the said cup, and its end only is subjected to the permanent action of the vacuum. But if certain precautions were not taken, the vacuum existing in the interior of the tube would flatten the latter under the action of the atmospheric pressure. In order to avoid this flattening effect, the body of the teat, which is surrounded by the elastic element 2b, is removed from the action of atmospheric pressure by forming a fluid-tight chamber 2k between said element and the casing 2a.

Another disadvantage of the milking cups at present employed resides in the fact that as a result of a free space existing between the flexible tube or element 2b and the teat when the apparatus is at rest, the teat is subjected to the action of the vacuum when the apparatus communicates with the source of vacuum. This vacuum which exists around the teat hinders milking by causing the teat to be congested.

In the milking cup according to the invention, the teat is protected from the action of the vacuum by the fact that the teat is lodged in the elastic element 2b which, in the position of rest, adheres perfectly to the said teat. The element 2b, which has a diameter less than that of the teat, serves at the same time for suspending the milking cup. The diameter of this element 2b, is chosen in such a way that even by undergoing a radial tension produced by the vacuum existing in the chamber 2k, it does not separate from the teat and thus prevents the vacuum from acting on the body of the teat.

The fluid-tight condition of this chamber 2k is secured by means of packings, one formed by the ring 2m around which is wound a part of the elastic sleeve 2b and which is located in a corresponding cavity formed in the inner wall of the casing 2a, and another formed by a projection 3a capable of bearing upon the inclined surface 2p of the sleeve 2a, this projection forming part of a connecting member 3 acting between the casing 2a and the duct 3k connected to the collecting receptacle and to the vacuum apparatus, not shown in the drawing.

The ring 2m is held against the wall of the corresponding cavity by arranging a cap 2s made of rubber or similar material and of suitable shape upon the end 2t of the casing which is provided with a rim. The atmospheric pressure is prevented from entering between the contacting parts of the body of the teat and of the elastic element 2b by the fact that the rim of a central orifice in the cap 2s, which orifice is of corresponding diameter to that of the teat, presses against the latter towards the end adjacent to the udder.

The packing which prevents the access of atmospheric pressure along the outer wall of the teat may also comprise a ring made of so-called spongy rubber situated near the end 2t of the casing 2a.

The flattening of the teat and consequently of the sleeve or tube 2b is prevented by putting the chamber 2k into communication with the vacuum duct 3k by means of an orifice such as 3p provided in the connecting element 3.

Instead of being bored in the connecting element 3 this orifice 3p may also be formed at the lower end of the casing 2a. It will be understood that the communication between the chamber 2k and the duct 3k may be obtained by means of two or more orifices, some being bored in the element 3 and the others being provided at the lower end of the casing 2a.

The equilibrium between the forces acting upon the teat having been obtained, the suction will be produced only at the end of the teat on which the suction acts.

The invention also provides for the body of the test to be removed from the action of atmospheric pressure by employing simply one sheath, such as the flexible element 2b, formed in such a manner as to perform at the same time the two following functions: firstly, to adhere sufficiently to the teat to secure the suspension of the apparatus (as is done by the element 2b shown in the drawing) and secondly, to oppose externally a sufficient resistance to counter balance the action of atmospheric pressure which tends to be exerted as a consequence of the vacuum existing in a part of the teat and which can also exist over the length of the external wall of the latter.

Such a faculty of resistance may be given to the sleeve 2b by providing it with a suitable framework. This resistance may also be obtained by making said sleeve rigid with an undeformable sleeve such as the casing 2a by means of springs exerting a peripheral pull away from the axis of the sleeve 2b.

What I claim is:

A milking cup, comprising a rigid casing connected at its lower end with a conduit leading to a continuous vacuum, a cylindrical elastic nipple joined at one of its ends to the upper portion of the said casing and joined at its other end to the said conduit, the nipple having a thin wall and a diameter sufficiently small to envelop a teat of small dimension and adapted on account of its thin wall and its elasticity to permit the introduction of large teats, and an annular airtight pocket between the casing and the nipple, the conduit being provided with an opening leading to the air-tight pocket to permit the same vacuum to act on the pocket and on the nipple.

In testimony whereof I have affixed my signature.

FERNAND HENRARD.